United States Patent Office 2,958,686
Patented Nov. 1, 1960

2,958,686

PURIFYING ORGANOMETAL-CATALYZED ISOTACTIC POLYSTYRENE BY CHLORINATION

Kenneth R. Dunham, John Van Den Berghe, and William J. Dulmage, Rochester, N.Y., assignors to Eastman Kodak Company, Rochester, N.Y., a corporation of New Jersey No Drawing. Filed June 23, 1959, Ser. No. 822,178

7 Claims. (Cl. 260—93.5)

This invention relates to a process for preparing isotactic polystyrene of very high purity and superior physical properties.

In the preparation of polymers from α-olefins polymerization catalysts are employed comprising certain organometallic materials which are extremely difficult to remove and consequently the appearance and properties of the polymeric product are adversely affected. This is particularly true with the so-called Ziegler type of compounds which comprise mixtures of organo-aluminum catalysts containing aluminum to hydrocarbon bonds and a halide of a transmission metal from groups IV to VI of Mendeleef's periodic arrangement of the elements ["Handbook of Chemistry and Physics," 23rd edition, pages 344–5, Chemical Rubber Publishing Co., Cleveland, Ohio (1939)], for example, aluminum alkyls and titanium halides. For instance, incompletely purified isotactic polymers, i.e. containing catalyst residues, discolor when heated and give lumpy, inhomogeneous extrusions of very poor tensile strength and elasticity, even when the catalyst residue is present in only small amounts. Obviously, such impure products are unsuitable for commercial applications in the fiber and sheet-making arts.

Various methods have been proposed heretofore to eliminate the catalyst residues from such polymers. For example, conventional methods of separation such as filtration of the viscous dispersions or solutions obtained in the polymerization processes have been found to remove only the relatively larger catalyst particles. Other proposed methods such as leaching with alcohol followed by treating with hydrochloric acid or treating with steam, while eliminating the bulk of the catalyst residues, also have not proven satisfactory because the so treated polymeric products still retain sufficient catalyst residues to limit seriously their commercial uses. Another proposed method which calls for partial coagulation of the polymer solution for the purpose of occluding residues in a more readily filterable precipitate likewise has not proven entirely efficacious or commercially feasible.

We have now discovered a unique and efficient method for preparing a very pure, highly crystalline isotactic polystyrene from such polystyrene containing catalyst residues derived from an organometallic catalyst used in the preparation of said polystyrene, which comprises treating a solution of the impure polystyrene with chlorine gas at an elevated temperature, followed by filtration of the treated solution while still hot and separation of the purified polymer from the filtrate. The purified polymeric product thus obtained may be formed into fibers or films having outstanding physical properties, and biaxially oriented films thereof are particularly useful as film supports for photosensitive layers.

It is, accordingly, an object of the invention to provide a novel method for preparing a very pure, highly crystalline form of isotactic polystyrene. Another object is to provide a novel chlorination-filtration method for removing substantially all of the catalyst residues and other impurities from crude isotactic polystyrene. Another object is to provide a novel method for removing Ziegler type of catalyst residues by the above treatment from isotactic polystyrene prepared with such catalysts. Other objects will become apparent hereinafter.

In accordance with the invention, we prepare our very pure isotactic polystyrene by first dissolving the impure polystyrene prepared, for example, with and still containing residues of a catalyst comprising triethyl-aluminum and titanium tetrachloride in a molar quantity of from 1–15 moles of the triethylaluminum to each mole of the titanium tetrachloride, in an inert aromatic hydrocarbon solvent having a boiling point about from 110–215° C., for example, toluene, xylene, etc., but preferably higher boiling solvents, e.g. hydronaphthalenes such as tetralin, decalin, dihydronaphthane, hexahydronaphthalene, etc., then passing chloride gas into the solution at elevated temperatures for a period of at least 15 minutes, but preferably from 1–6 hours, followed by removing the suspended solids by centrifuging or filtering the thus treated solution one or more times while hot (at about 100–215° C.) through a filtering material, and then isolating the purified polystyrene by conventional separation means, for example, by pouring the filtrate into a non-solvent such as for example methanol, acetone, methyl ethyl ketone, ligroin, etc. Crystallization is effected by boiling in acetone, then in methyl ethyl ketone. Advantageously, the mixture is stirred during dissolution and chlorination. To prevent explosions by too rapid chlorination, the chlorine gas is mixed with an inert gas such as for example nitrogen prior to or in the reaction vessel, in the ratio of from 1:3 to 3:1 parts by volume of chlorine to nitrogen. Advantageously, the chlorination reaction is carried out under anhydrous conditions. The concentration of the polymer in the hydrocarbon solvent can vary from 1–15% of solids. The temperature of chlorination can vary about from 110–215° C., but preferably about from 130–215° C. While the reaction is ordinarily conducted at normal atmospheric pressure, if desired, higher than atmospheric pressures can also be employed, e.g. where the particular hydrocarbon solvent is used at temperatures above its normal boiling point. Also, the method can be carried out in continuous manner. It will also be understood that the filtration step may be repeated as many times as desired and that various known filtering materials are efficacious such as felt, paper, inorganic filtering materials and the like. Various filter aids may also be employed.

The uniqueness of the chlorination method of the invention for obtaining high purity isotactic polystyrene is demonstrated by a comparison with bromination by a similar procedure. In both cases, we have found the amount of halogen in the polymer is less than 1.0%; the bromine-treated polystyrene is dark grey, as compared to the white polymer obtained by the chlorination process of the invention. Also, upon extrusion, the bromine-treated polymer was found to undergo severe molecular breakdown and was rough and brittle, whereas the chlorine-treated polymer showed little, if any, breakdown and the extruded polymer was smooth and nearly colorless.

The following examples will serve further to illustrate our invention.

EXAMPLE 1

750 ml. of freshly distilled inhibitor-free styrene and 400 ml. of decalin, which had been dried over metallic sodium and distilled immediately prior to use, were placed in a 2-liter flask equipped with a power driven stirrer, a thermometer to read liquid temperature, a reflux condenser and an electrical heating mantle. There were then added with stirring 69 ml. of pure triethyl aluminum and finally dropwise 11 ml. of pure titanium tetrachloride.

The temperature was allowed to increase to 70° C. and maintained with stirring at this temperature by use of external heating or cooling as required for three hours. The reaction mixture was then cooled to about 40° C. and poured into a large volume of methanol (or methanol containing hydrochloric acid). Fresh methanol was added and the polymer mass broken into small pieces, and the polymer then washed with successive changes of methanol. At this point, the polymer still retains catalyst residues in amount precluding use thereof for commercial fiber and film-making purposes. The polymer can be subjected to the chlorination purification step of the invention in this methanol moistened condition or, if desired, the polymer can be dried first and then chlorinated.

EXAMPLE 2

776 g. of isotactic polystyrene prepared as described in above Example 1 were added with stirring to 7760 ml. of previously heated decalin (at 176° C.) contained in a 12-liter three-necked flask equipped with a paddle-type stirrer, a thermometer, a reflux condenser and an electrical heating mantle. The mixture was heated up to about the boiling point of the solvent until a homogeneous solution was obtained. Then chlorine and nitrogen gases were simultaneously bubbled into the solution over a period of 1–6 hours while maintaining the reaction temperature between 130° C. and the boiling point of the solvent (193° C.). During this period, hydrogen chloride is evolved. After chlorination, the solution was filtered hot by suction through a layer of washed felt in a heated Buchner funnel and the filtrate stirred with successive portions of methanol. The two layers which formed were allowed to separate and the methanol removed. This process was repeated until polymer began to precipitate. A large excess of methanol was then added with stirring and the precipitated polymer obtained was washed first with methanol, then with acetone. The polymer was dried and redissolved in xylene, the solution filtered and the polymer reprecipitated by pouring the filtrate into methanol. Isolation of the polymer can also be readily effected by pouring the solution into non-solvents such as ligroin. Crystallization was effected by boiling the polymer in acetone. Extraction with boiling methyl ethyl ketone removed additional low molecular weight material. The polymer was then dried to constant weight at 40° C. under vacuum.

This isotactic polystyrene was found to be extremely pure, containing no measurable ash and no measurable aluminum or titanium residues. Also, the amount of chlorine retained in the polymer was less than 1.0% by weight. Gel-free solutions were obtained therewith in solvents such as benzene, toluene and xylene. However, good quality films and sheets cannot be obtained from these solutions by coating the same. On the other hand, this isotactic polystyrene was melt extrudable into fibers and films having greatly improved physical properties. The extruded monofilaments and sheets were flexible, smooth, clear and bubble-free. It is highly significant that, although the impure highly isotactic polystyrene gives brittle, opaque extrusions, even though the extruded polymer is completely amorphous, vastly improved properties are obtained with the highly pure polymer.

EXAMPLE 3

This example illustrates the results obtained when the polystyrene prepared according to above Example 1 is purified by ordinary methods i.e. without the benefit of the chlorination step of our invention.

The methanol washed precipitate of isotactic polystyrene prepared according to Example 1 was heated in boiling acetone and the liquid poured off. This procedure was repeated until no further solids were extracted by the acetone. The polymer was then dried to constant weight at 40° C. under vacuum. Yields on several runs averaged 40% based on the weight of the starting monomeric styrene. The polystyrene thus obtained was mainly insoluble in solvents such as benzene, toluene or xylene, even at their boiling points. The soluble portions comprised only a small percentage of the total polymer and were of low molecular weight. Higher boiling solvents such as decalin or trichlorobenzene dissolved the polystyrene at elevated temperatures but gelation occurred when these solutions were cooled below 130° C. The ash content was found to be greater than 0.5% comprising from 15–45% by weight of aluminum and 0.3 to 0.9% by weight of titanium. Extrusions of this polystyrene were cloudy, filled with bubbles and brittle, even though the polymer itself was highly crystalline. Further purification was accomplished by dissolving the polymer in decalin or trichlorobenzene at elevated temperatures, filtering the solution while hot and precipitating into a non-solvent such as methanol or ligroin. Although this treatment lowered the ash content to less than 0.1%, extruded monofilaments prepared from this further purified polymer were hazy and exhibited little or no improvement in properties over atactic polystyrene which is a nonstereospecific form of polystyrene.

The following table lists the physical properties of monofilaments prepared from a representative commercial type of oriented atactic polystyrenes as compared to similar monofilaments prepared from oriented isotatic polystyrene prepared according to the process of the invention.

Table

MECHANICAL PROPERTIES OF ORIENTED POLYSTYRENES

| Sample | Young's Modulus ×10⁻⁴, kg./cm.² | Tensile Strength kg./cm² | Elongation at Break (Percent) | Heat Distortion Temperature, ° C. |
| --- | --- | --- | --- | --- |
| Monofil, Commercial atactic, stretched 210% at 110° C | 3.4 | 810 | <4 | 100 |
| Monofil, Example 2, isotactic stretched 355% at 102° C | 5.2 | 1,130 | 15 | >200 |
| Monfil, Example 2, isotactic, stretched 313% at 102° C | 7.2 | 1,940 | 22 | 172 |
| Monofil, Example 2, isotactic, stretched 275% at 102° C | 8.45 | 1,690 | 24 | >200 |
| Sheet, Plax PB ¹ | 3.5 | 810 | 3.6 | 100 |

¹ This is a commercially available oriented atactic polystyrene sheeting material manufactured by the Plax Corporation.

By reference to the above table, it will be seen that the monofilaments prepared with the isotactic polystyrenes produced according to the chlorination purification process of Example 2 of the invention show from about 50% to 100% higher modulus, tensile strength and heat distortion temperatures and up to about six times greater elongation at the break point than is shown by the commercial specimens of atactic polystyrene. No comparison data with the crude istactic polystyrene of Example 1 and the incompletely purified product of Example 3 are included because of inability to obtain anything but bubbly brittle monofilaments and films therefrom. Accordingly, the data of the table indicate that istotactic polystyrene prepared in accordance with the chlorination-filtration process of Example 2 of the invention are outstanding materials for fiber and film-forming purposes.

Although the preceding description and examples have been concerned primarily with monofilaments of outstanding properties, it will be understood that the purified polystyrene of the invention illustrated in above Example 2 is also highly useful for the preparation of biaxially oriented films of generally similar greatly improved physical properties. For example, such biaxially oriented films having improved properties have been coated with light-sensitive layers, for example, a gelatino-silver halide emulsion layer or a light-sensitive synthetic polymer layer that becomes insoluble on exposure to light and the elements so produced are exposed and then developed to images. In one example, the light-sensitive system was a silver halide emulsion layer, in another example it was a gelatin-bichromate layer, while in still another example the light-sensitive layer comprised a photosensitive polymeric stilbazole such as described in G. W. Leubner et al., U.S. Patent 2,811,510, dated October 29, 1957. Other applications of the high purity isotactic polystyrene of the invention include uses as moistureproof packaging materials, as backings for other more conventional film supports such as polyethylene terephthalate, cellulose esters, etc., as material of high dielectric constant for electric motors and the like. If desired, modifying materials such as fillers, dyes, pigments, lubricants, softeners, etc. can be incorporated in the polystyrene melts for the extrusion and molding of various shaped articles.

The invention has been described in detail with particular reference to preferred embodiments thereof, but it will be understood that variations and modifications can be effected within the spirit and scope of the invention as described hereinabove and as defined in the appended claims.

What we claim is:

1. A process for purifying an isotactic polystyrene containing catalyst residues derived from a catalyst comprising an organo-aluminum compound having aluminum to carbon bonds and a halide of a transition metal of groups IV to VI of Mendeleef's periodic arrangement of the elements, said mixed catalyst having been used in the preparation of the said polystyrene, which comprises the steps (1) heating the said polystyrene in an aromatic hydrocarbon solvent having a boiling point about from 110°–215° C. until a homogeneous solution is obtained (2) passing chlorine and nitrogen gases simultaneously into said solution maintained at a temperature of from 130°–215° C. and (3) filtering the said solution in a heated condition.

2. The process of claim 1 wherein the purified isotactic polystyrene is separated as a precipitate from the said filtered solution by mixing the said solution with methanol.

3. The process of claim 1 wherein the purified isotactic polystyrene is separated as a precipitate from the said filered solution by mixing the said solution with ligroin.

4. The process of claim 1 wherein the said chlorine gas and the said nitrogen gas are present in volume ratios of from 1:3 to 3:1.

5. The process of claim 1 wherein the said steps (1), (2) and (3) are carried out in continuous manner.

6. A process for purifiying an isotactic polystyrene containing catalyst residues derived from a triethyl aluminum and titanium tetrachloride mixed catalyst used in the preparation of said polystyrene which comprises the steps (1) heating the said polystyrene in decalin until a homogenous solution is obtained, (2) passing equal volumes of chlorine and nitrogen gases simultaneously into said solution maintained at a temperature of from 130°–193° C., (3) filtering the said solution while hot and (4) separating the purified polystyrene as a precipitate by mixing the said filtrate with methanol.

7. The process of claim 5 wherein the said steps (1), (2), (3) and (4) are carried out in continuous manner.

No references cited.